M. RATIGNIER & H. PERVILHAC.
METHOD OF PRODUCING ARTIFICIAL LACE FABRIC AND THE LIKE.
APPLICATION FILED JUNE 22, 1907.

934,214.

Patented Sept. 14, 1909.

WITNESSES

INVENTORS
Marius Ratignier
Henry Pervilhac
ATTY

UNITED STATES PATENT OFFICE.

MARIUS RATIGNIER AND HENRY PERVILHAC, OF LYON, FRANCE.

METHOD OF PRODUCING ARTIFICIAL LACE FABRIC AND THE LIKE.

934,214.  Specification of Letters Patent.  Patented Sept. 14, 1909.

Application filed June 22, 1907. Serial No. 380,366.

*To all whom it may concern:*

Be it known that we, MARIUS RATIGNIER and HENRY PERVILHAC, residing at Lyon, in France, have invented a certain new and useful Method of Producing Artificial Lace Fabric and the Like, of which the following is a specification.

This invention has for its object the manufacture of artificial fabrics with meshes or tracery resembling bobbinet, gauze, muslin, lace, embroidery etc., by means of collodion such as is used for manufacturing artificial silk, or of any other viscous or pasty matter adapted to be molded into the shape of filament and to acquire a sufficient consistency when dry.

The process of manufacture is carried out in the following manner. The pattern to be reproduced is engraved on a cylinder of metal, ebonite, glass or other polished material, the grooves being equal in width and depth to the filaments of which the pattern is composed; the engraving represents the design to be reproduced. The recesses in the cylinder are then filled with the substance of which the fabric is to consist. This may be effected by methods similar to those used for inking printing-blocks for reproducing copper-engravings. While on the cylinder this substance is treated with a hardening agent or agents, the nature of which varies according to the nature of the substance itself. Then the substance is detached in the form of a fabric, which may be directly used or may be subjected to further treatment, for example for separating nitrogen, if the substance used is collodion, or for saturating or completing the solidification thereof in the case of other substances. The substances employed may be the different collodions, and a solution of cellulose niter in ether and in alcohol. The coagulating agents are those employed in the manufacture of artificial silk for example methyl alcohol.

The annexed drawing illustrates by means of an example the principle of the invention.

Figure 1:
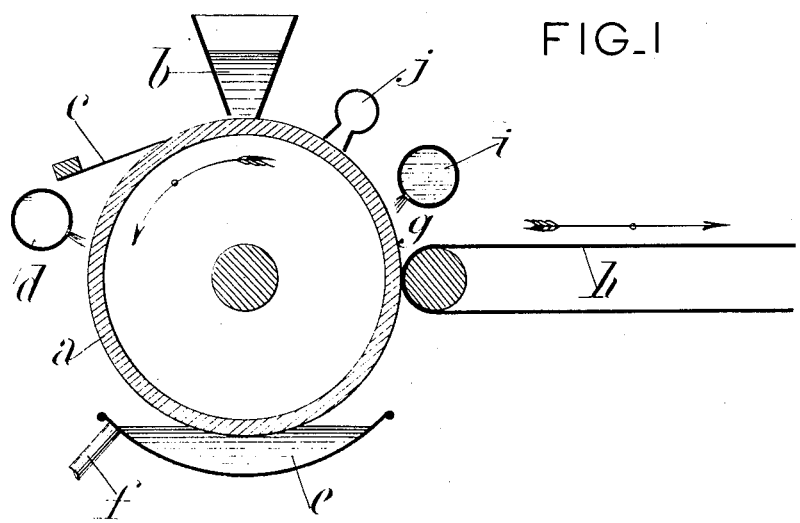
Figure 2:
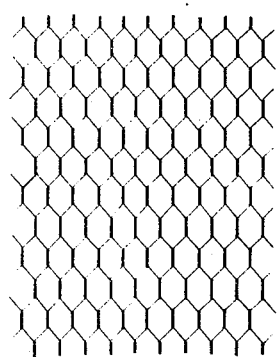
Figure 3:
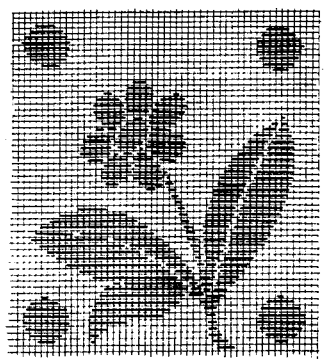

In this drawing Figure 1 shows a sectional view of an apparatus for carrying out the invention and Figs. 2 and 3 show the resulting pattern, the latter being provided with a design.

The engraved cylinder $a$ (Fig. 1) revolves about a horizontal axis in the direction indicated by the arrow. Above the said cylinder is placed a funnel $b$, from which the viscous substance flows on to the engraved surface, on which it forms a thin layer. A strickle $c$, or a plurality of strickles, remove from the surface all the substance in excess of that which is required to fill the grooves. The substance in the grooves is immediately subjected to the action of a liquid hardening agent supplied through a tube $d$, and projected in the form of jets or spray on to the cylinder $a$. These liquids, which accompany the cylinder, accumulate in a trough $e$, into which the cylinder $a$ dips to a slight extent, and from which the liquid overflows through a pipe $f$.

The solidified substance is detached from the cylinder at $g$ and is conveyed away by an endless cloth $h$ having the same surface velocity as the cylinder $a$. The latter is washed by a jet of water from a pipe $i$ and then dried by an air-current sucked into a pipe $j$, whereupon it receives a fresh supply of viscous substance from the funnel $b$.

What we claim as our invention and desire to secure by Letters Patent of the United States is:—

1. The continuous method of producing artificial fabric resembling lace from plastic composition, consisting in continuously and simultaneously producing a plurality of interconnected filaments at a single casting operation, continuously applying a hardening solution to said filaments to form the fabric, and continuously removing the finished fabric.

2. A method of making lace, consisting in discharging upon a roller, the surface of which is engraved with grooves of lace pattern, a material such as gelatin, in substantially liquid condition, so as to fill the grooves, rotating said roller, removing the surplus material, hardening the materials remaining in the grooves and then removing the lace so formed.

In witness whereof we have signed this specification in the presence of two witnesses.

MARIUS RATIGNIER.
HENRY PERVILHAC.

Witnesses:
GASTON JEANNIAUX,
THOMAS N. BROWNE.